(12) United States Patent
Kirsch et al.

(10) Patent No.: US 12,730,205 B2
(45) Date of Patent: Sep. 8, 2026

(54) RADAR METHOD AND RADAR SYSTEM FOR A PHASE-COHERENT ANALYSIS

(71) Applicant: Symeo GmbH, Neubiberg (DE)

(72) Inventors: Fabian Kirsch, Schiffdorf (DE); Christoph Mammitzsch, Neubiberg (DE)

(73) Assignee: Symeo GmbH, Neubiberg (DE)

( * ) Notice: Subject to any disclaimer, the term of this patent is extended or adjusted under 35 U.S.C. 154(b) by 761 days.

(21) Appl. No.: 17/996,600

(22) PCT Filed: Apr. 13, 2021

(86) PCT No.: PCT/EP2021/059524
§ 371 (c)(1),
(2) Date: Jun. 23, 2023

(87) PCT Pub. No.: WO2021/213843
PCT Pub. Date: Oct. 28, 2021

(65) Prior Publication Data

US 2024/0036183 A1 Feb. 1, 2024

(30) Foreign Application Priority Data

Apr. 20, 2020 (DE) ......................... 102020110696.3

(51) Int. Cl.
*G01S 13/00* (2006.01)
*G01S 13/42* (2006.01)
(Continued)

(52) U.S. Cl.
CPC ............ *G01S 13/003* (2013.01); *G01S 13/42* (2013.01); *G01S 13/931* (2013.01)

(58) Field of Classification Search
CPC ....... G01S 13/003; G01S 13/42; G01S 13/931
See application file for complete search history.

(56) References Cited

U.S. PATENT DOCUMENTS

2019/0212411 A1* 7/2019 Kang ......................... G01S 3/46
2019/0369207 A1* 12/2019 Sanada ................... G01S 7/006
(Continued)

FOREIGN PATENT DOCUMENTS

CN 110537106 12/2019
DE 102019125502 A1 3/2020
DE 102019125973 A1 4/2020

OTHER PUBLICATIONS

International Search Report and Written Opinion for PCT/EP2021/059524, Oct. 25, 2022, 9 pages.
(Continued)

*Primary Examiner* — William Kelleher
*Assistant Examiner* — Juliana Cross
(74) *Attorney, Agent, or Firm* — Schwegman Lundberg & Woessner, P.A.

(57) ABSTRACT

The invention describes a radar method for the coherent evaluation of radar signals in a radar system, in particular a multistatic radar system, wherein at least one or a plurality of received signals is/are received in several signal channels of an antenna arrangement, and wherein a synthetic received signal of a virtual transmitting and receiving antenna is generated using at least one composition model on the basis of the one or more received signals.
The invention further describes a radar system according to claim 9 as well as a use of the radar system according to claim 14.
The invention enables coherent evaluation of radar signals without the need to use a reciprocal signal propagation channel between the participating radar units of the radar system.

19 Claims, 4 Drawing Sheets

Figure 1:
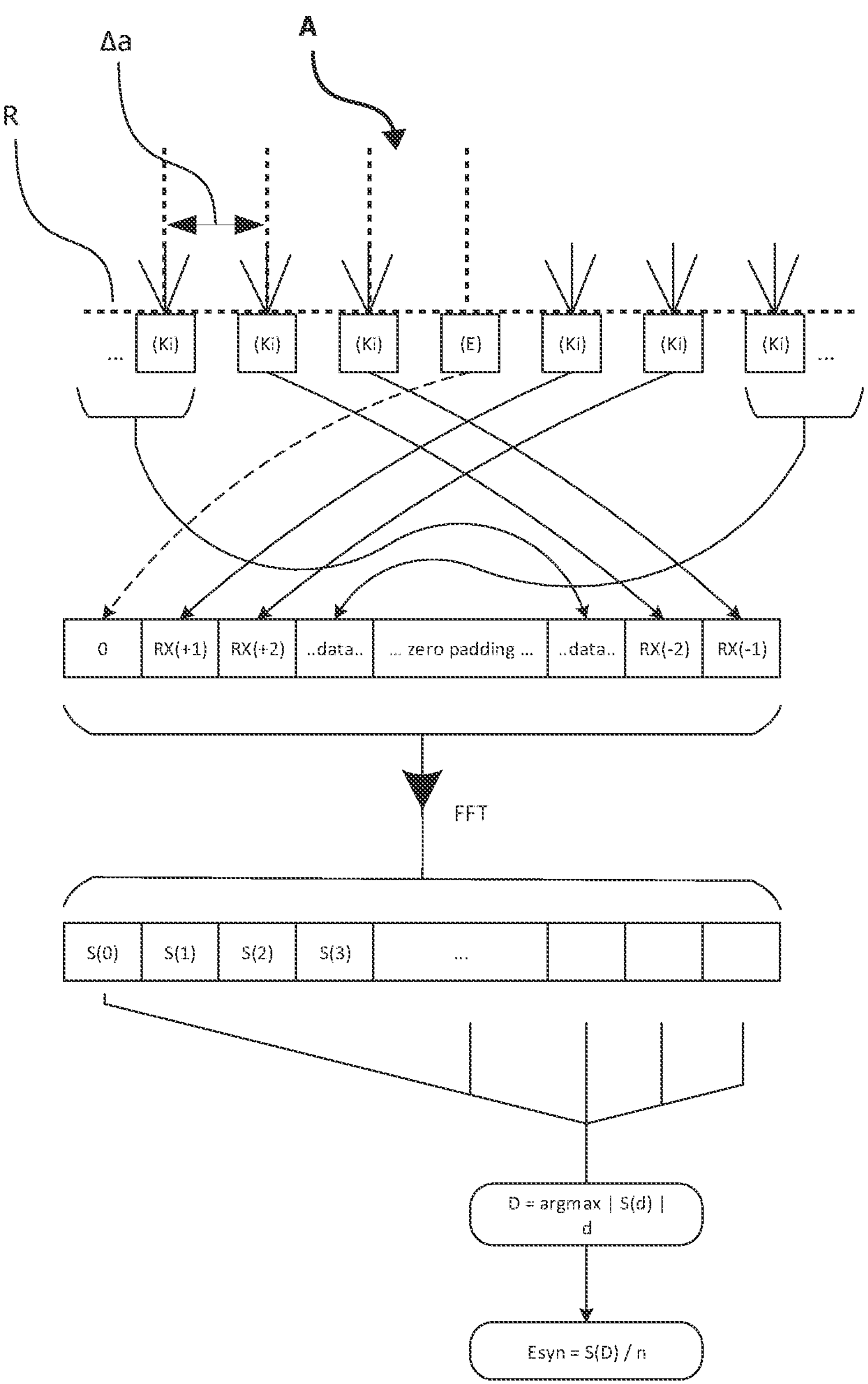

(51) Int. Cl.
*G01S 13/93* (2020.01)
*G01S 13/931* (2020.01)

(56) References Cited

U.S. PATENT DOCUMENTS

2020/0103495 A1* 4/2020 Iwasa .................... G01S 7/4026
2021/0190912 A1* 6/2021 Feng ..................... G01S 13/931

OTHER PUBLICATIONS

"European Application Serial No. 21720184.7, Communication Pursuant to Article 94(3) EPC mailed Dec. 19, 2024", w/ English translation, 9 pgs.
"Chinese Application Serial No. 202180029843.2, Office Action mailed Mar. 10, 2026", w English Translation, 14 pgs.

* cited by examiner

RADAR METHOD AND RADAR SYSTEM FOR A PHASE-COHERENT ANALYSIS

CLAIM OF PRIORITY

This application is a U.S. national stage filing under 35 U.S.C. § 371 from PCT Application Serial No. PCT/EP2021/059524, filed on Apr. 13, 2021, and published as WO 2021/213843 A1 on Oct. 28, 2021, which claims the benefit of German Application Serial No. 102020110696.3, filed on Apr. 20, 2020, the benefit of priority of each of which is claimed herein, and each of which are hereby incorporated herein by reference in their entirety.

The invention relates to a radar method for coherent evaluation of radar signals according to claim 1, a radar system according to claim 10 and the use of the radar system according to claim 15.

In (multistatic) radar systems, it is known to be advantageous to perform a coherent evaluation of the radar signals, since a high accuracy can be achieved for many applications by a coherent evaluation of the radar signals.

Hereby, for example, radar signals are emitted by the radar system, reflected or scattered by an object, and then the radar signals backscattered or reflected by the objects of an environment are received by the radar system. A multistatic radar system is generally understood to mean, in particular, a radar system consisting of several monostatic or bistatic radar units covering a specific environment or a specific area.

In a coherent evaluation, it can be assumed that there is a phase relationship between the transmitted signal(s) and the received signal(s) of the radar units.

However, this phase relationship is no longer necessarily given with several radar units of a (multistatic) radar system, which sometimes operate in different clock domains.

Thus, for a coherent evaluation, a phase-accurate synchronisation of the participating radar units or stations is mandatory.

In the state of the art, there are approaches in which a phase-accurate synchronisation is realised with additional synchronisation units that synchronise the radar units of a (multistatic) radar system with each other. However, this results in a considerable additional effort with regard to the hardware of the radar system, which increases the manufacturing costs of the radar system.

In the US patent application US 2017/0176 583 A1 (hereinafter referred to as patent application 1), a radar system and a radar method are described in which a synchronisation between the several radar units of the radar system is not made possible with additional synchronisation units, but by a post-processing of the received signals.

Furthermore, in the international patent application WO 2017/118 621 A1 (hereinafter referred to as patent application 2) a suppression of oscillator phase noise by post-processing is described, whereby a reciprocal channel is required. In patent application 2 a transmission mixer is shown as a suitable means for realising the reciprocal channel. Patent application 2 thus discloses a further embodiment variant for the above phase noise suppression.

Furthermore, in international patent application WO 2017/102 159 A1 (hereinafter referred to as patent application 3) a (highly accurate) method for measuring propagation time differences for radiolocation systems using stations in full-duplex operation is described. Occurring clock errors are reduced or (approximately) eliminated here by a suitable post-processing.

For such a post-processing, however, it is mandatory that each of the participating radar units has at least one antenna that is operated in full-duplex mode.

This means that the at least one antenna of each participating radar unit is operated in such a way that a transmit signal is emitted and a received signal (i.e. a transmit signal of another radar unit) is received at least partially overlapping, preferably (approximately) simultaneously.

Particularly for measurement or evaluation methods in which, for example, distances and/or the relative velocities of objects to the radar system are determined, it is advantageous and sometimes necessary for the achievable accuracy that a reciprocal signal propagation channel exists or is used between the different clock domains of the participating radar units of the radar system.

Full-duplex operation, however, leads, in particular in radio applications where high attenuations can sometimes occur in the signal propagation channel, to a high channel dynamic for the participating radar units, which can only be controlled with a high technical effort.

For example, in D. Bharadia, E. McMilin, and S. Katti, "Full duplex radios," in Proc. of ACM SIGCOMM, 2013, pp. 375-386 it is described, that during a full duplex operation of a transmitting and receiving unit (or a transmitting and receiving antenna) in particular an overcoupling of interferences or crosstalk (self-interference) between the transmitting channel and the receiving channel can occur. This leads to a significant increase in the noise level in the receiving channel due to the (approximately) simultaneously emitted transmit signal.

It is therefore the object of the invention to provide a radar method and a radar system with which the disadvantages of the radar systems or radar methods known from the prior art are eliminated and with which a coherent evaluation of radar signals is made possible without having to use a reciprocal signal propagation channel between the participating radar units of the radar system.

The object is solved by a radar method for coherent evaluation of radar signals according to claim 1, a radar system according to claim 10, as well as a use of the radar system according to claim 15.

In particular, the object is solved by a radar method for the coherent evaluation of radar signals in a radar system, in particular a multistatic radar system, wherein at least one received signal or a plurality of received signals is/are received in several signal channels of an antenna arrangement, and wherein a synthetic received signal of a virtual transmitting and receiving antenna is generated using at least one composition model on the basis of the one or more received signals.

An idea of the invention is based on the fact that instead of a direct physical detection of a received signal at a reciprocal (transmitting and receiving) channel or at a transmitting and receiving antenna, a common virtual transmitting and receiving antenna is defined and the received signal of this virtual transmitting and receiving antenna is calculated from one or a plurality of signal channels.

First, a detection of a received signal or a plurality of received signals is performed on one or a plurality of signal channels of an antenna arrangement of the radar unit. With the one or the plurality of received signals, a synthetic received signal of a virtual transmitting and receiving antenna is generated or calculated on the basis of a composition model, in particular taking into account the propagation conditions.

The synthetic received signal corresponds to an (ideal) received signal that would have been detected (received)

with a common transmitting and receiving antenna, whereby advantageously no physical coupling of interferences (crosstalk) is possible with such a virtual transmitting and receiving antenna.

Furthermore, the antenna design can be selected without further restrictions with regard to the cross-coupling properties of interference.

It is particularly advantageous here that, in particular in the radar method according to the invention or in the radar system according to the invention, no countermeasures, which can be elaborate, have to be taken against a coupling-over of interferences (crosstalk) between the signal channels of the transmitting and receiving antennas.

In addition, a combination of a transmitting and receiving path is dispensed with, whereby, depending on the design, for example, the manufacturing costs of the radar system can be reduced, lower failure rates can be achieved, wider temperature ranges can be used, and/or a better sensitivity can be achieved.

In particular, a synthetic received signal can also be generated using a composition model on the basis of only one received signal if, for example, additional information about the received signal is available. For example, this would be the case if the radar method according to the invention is integrated in a tracking framework in which, with respect to an object to be tracked from a previous time step, for example, an expected angle of incidence for the received signal is known.

In this context, a composition model of the received signal or of the plurality of received signals can be understood as a model of the propagation components of the received signal or signals, whereby this model can be generated, for example, by decomposing the at least one or the plurality of received signals into several different propagation components.

A virtual transmitting and receiving antenna may be understood to mean a transmitting and receiving antenna that is not physically present, but whose received signal is synthesised.

In a preferred embodiment, a time-division multiplexing method or propagation time multiplexing method is applied to the at least one or the received signals in such a way that a number of the signal channels is greater than a number of the transmitting and receiving antennas of the antenna arrangement.

By that, preferably more signal channels can be realised than are physically present due to the number of receiving antennas of the antenna arrangement.

For example, when using a time-division multiplexing method, one hardware channel (i.e. one of the plurality of antennas of the antenna arrangement) can be operated in half-duplex, so that this hardware channel can be used selectively as a transmitting channel and as a receiving channel. In particular, when the radar system is moving through a relatively static scene, the use of a time-division multiplexing technique may be advantageous.

When using a propagation time multiplexing method, also more signal channels than are physically present due to the number of receiving antennas of the antenna arrangement can be realised. This can be realised, for example, in scenarios in which reflective surfaces are arranged in a known position in the immediate vicinity of the antenna arrangement.

In a preferred embodiment, the received signal(s) is/are disassembled into several propagation components, which comprise in particular at least one of the following: propagation time, Doppler, azimuth and elevation components.

This makes it possible, in particular under the assumption of a plane phase front, i.e. the far-field approximation, to convert the respective azimuth and elevation components to the virtual received signal that a virtual receiving antenna would receive.

It is also conceivable, of course, that, under the assumption of a spherical surface phase front, i.e. spherical surfaces with constant phase and almost constant amplitude, in the transition region between far and near field or under the assumption of a more complex approximation for the near field, the respective azimuth and elevation components are converted for the virtual received signal.

In particular, the propagation components of the synthetic received signal are calculated from the azimuth and elevation components of the at least one or the received signals.

In one embodiment, if several propagation components are disassembled into the same propagation time and/or Doppler component, these propagation components are taken into account with a weighting that is smaller than the weightings of the other propagation components.

This can make it possible to further reduce any interfering influences, since the propagation components that have been disassembled into the same propagation time and/or Doppler component may have falsified the determination of the azimuth and/or elevation components.

Preferably, if several propagation components are disassembled into the same propagation time and/or Doppler component, these propagation components are not taken into account in the calculation for the propagation components of the synthetic received signal, whereby the previously mentioned interfering influences can be further reduced.

In particular, the at least one or the several received signals is/are disassembled into several principal components using a principal component analysis.

With the aid of the principal component analysis, the strongest signal component, i.e. the principal component, can be found, whereby the parameters of the principal component can be checked as to whether they fit, for example, the model of a strong point scatterer or another characteristic scatterer.

In a further (alternative) embodiment, the at least one or the several received signals is/are analysed with one of the following methods: Independent-Component-Analysis, Multiple-Signal-Classification (MUSIC), Estimation-of-Signal-Parameters-via-Rational-Invariance-Techniques (ESPRIT), or Iterative-Sparse-Asymptotic-Minimum-Variance (SAMV).

With an Independent-Component-Analysis, for example, the one or the several received signals can be disassembled into different propagation components, similar to the principal component analysis.

The Multiple-Signal-Classification-method makes it possible, for example, to determine the frequency and the direction of reception from its plurality of superimposed, interference-afflicted (received) signals.

The application of an Estimation-of-Signal-Parameters-via-Rational-Invariance-Techniques makes it possible in particular, among other things, also to estimate the angle of incidence of the noise-afflicted received signals.

The Iterative Sparse Asymptotic Minimum Variance technique, with which it is sometimes also possible to estimate the angle of incidence of the noise-afflicted received signals, is described, for example, in Abeida Habti, Qilin Zhang, Jian Li, and Nadjim Merabtine "Iterative sparse asymptotic minimum variance based approaches for array processing" *IEEE Transactions on Signal Processing* 61, no. 4 (2013): 933-944.

In particular, with the virtual transmitting and receiving antenna an at least approximately exactly reciprocal radio channel to at least one transmitting and receiving antenna of a further radar unit or radio installation away from the antenna arrangement is/are provided. Preferably, the antenna arrangement for which the virtual transmitting and receiving antenna is calculated is arranged in a first radar unit, wherein the further radar unit or radio installation is arranged away from the first radar unit. The further radar unit or the (further) radio installation may in this case be of similar type or also not similar type as the first radar unit.

Furthermore, the object of the invention is solved by a radar system, in particular a multistatic radar system, which has at least one radar unit with an antenna arrangement and/or at least one further radar unit with an antenna arrangement, wherein the radar system is designed to carry out the above method.

The radar system according to the invention has the advantages already described with respect to the method for coherent evaluation of radar signals in a (multistatic) radar system.

The features described in connection with the above radar method and the advantages associated therewith are also combinable with the radar system according to the invention and can in particular be implemented as a corresponding configuration of the system, in particular of the radar unit.

In particular, the antenna arrangement(s) of the radar unit(s) each have at least one or a plurality of transmitting and receiving antennas, wherein the at least one or the plurality of transmitting and receiving antennas is/are arranged on an (imaginary) straight line with the virtual transmitting and receiving antenna, whereby a particularly simple arrangement of the receiving antennas is achieved.

Preferably, the at least one or the plurality of transmitting and receiving antennas and the virtual transmitting and receiving antenna are arranged on an equidistant grid, wherein in particular the distance between the (individual) grid points is an integer multiple of a predetermined distance. Preferably, the at least one or the plurality of transmitting and receiving antennas and the virtual transmitting and receiving antenna can be arranged on the equidistant grid in such a way that the grid is only thinly or sparsely occupied, whereby a so-called sparse-array-antenna arrangement can be realised.

Due to such a comparatively simple arrangement of the receiving antennas, a phase relationship between the individual receiving antennas of the arrangement can be established particularly easily and taken into account when generating the synthetic received signal of the virtual transmitting and receiving antenna. The predetermined distance can be, for example, half a wavelength of the radar signals used.

In a further embodiment, the virtual transmitting and receiving antenna is arranged at least substantially centrally and symmetrically with respect to the transmitting and receiving antennas of the antenna arrangement, which further simplifies the structure of the arrangement. Furthermore, this makes the reconstructed synthetic received signal more robust against small errors in the determination of the angles of incidence of the signal components.

Preferably, a number of the signal channels is greater than a number of the transmitting and receiving antennas of the antenna arrangement, whereby more signal channels can be realised than are physically present by the number of receiving antennas of the antenna arrangement.

Furthermore, the object of the invention is solved by the use of the above method and/or the above system in a vehicle, preferably a motor vehicle. Also conceivable is the use according to the invention in mobile equipment, such as manned or unmanned aerial vehicles or preferably passenger cars and/or trucks.

Again, all features and therewith associated advantages which have been described in connection with the method according to the invention for coherent evaluation of radar signals in a (multistatic) radar system and the radar system according to the invention are applicable and transferable to the use of the radar system according to the invention.

Further embodiments will be apparent from the dependent claims.

Figure 2:
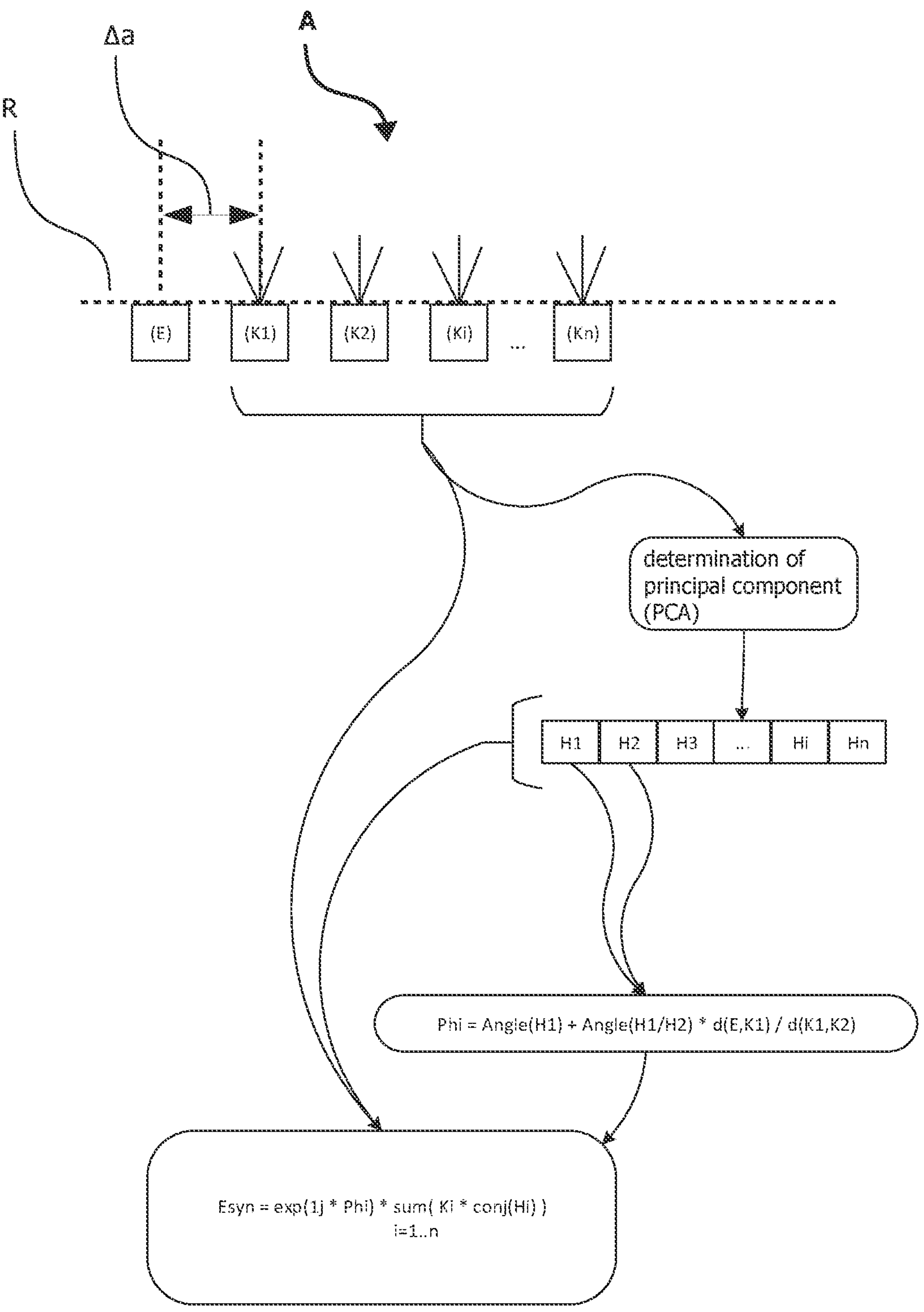
Figure 3:
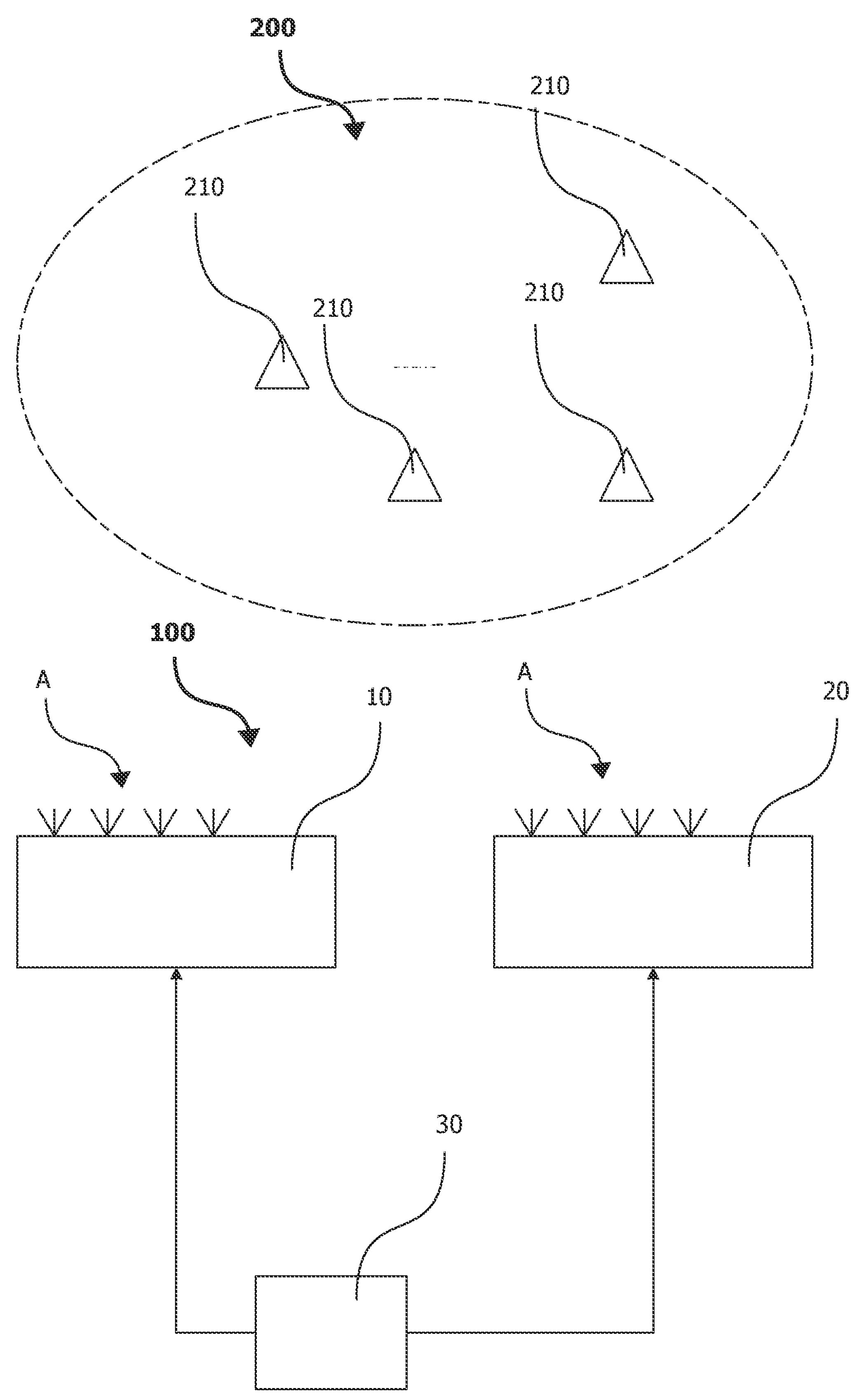
Figure 4:
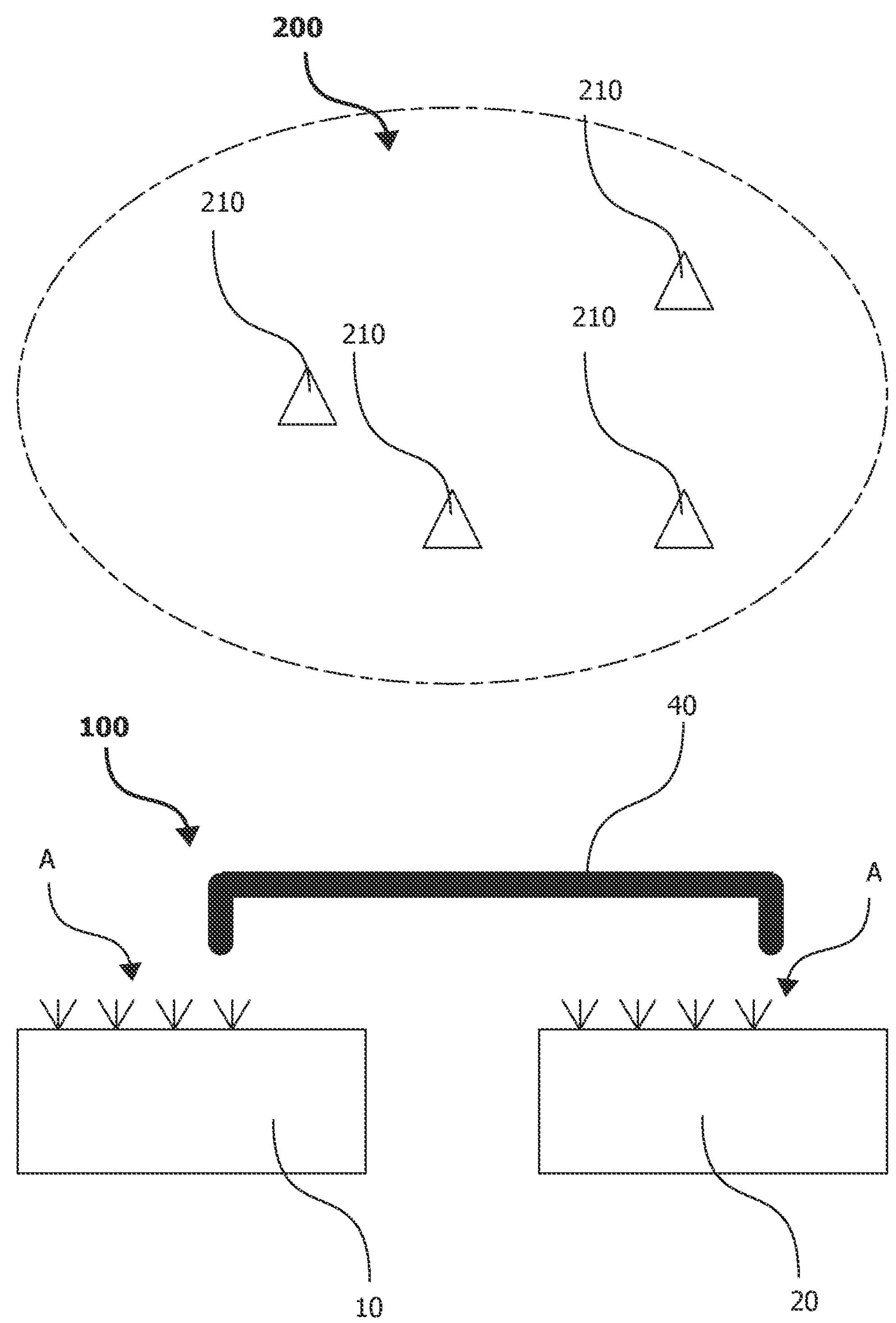

In the following, the invention will be further explained by means of non-limiting exemplary embodiments with reference to the accompanying drawings. Hereby show:

FIG. 1 a schematic arrangement of the antenna arrangements with a schematic representation of the signal processing according to an embodiment of the radar method according to the invention;

FIG. 2 a schematic arrangement of the antenna arrangements with a schematic representation of the signal processing according to a further embodiment of the radar method according to the invention;

FIG. 3 a schematic arrangement of an exemplary embodiment of the radar system according to the invention; and FIG. 4 a schematic arrangement of a further exemplary embodiment of the radar system according to the invention.

In FIG. 1 an exemplary embodiment of an antenna arrangement A of the radar system 100 according to the invention with a schematic sequence of signal processing is shown.

In the exemplary embodiment shown in FIG. 1, the antenna arrangement A has a plurality of transmitting and receiving antennas with which it is possible to receive a plurality of received signals Rx1, Rx2 to Rxn via several signal channels K1, K2, to Kn, wherein the transmitting and receiving antennas of the antenna arrangement A are arranged in a regular grid R with equidistant distances Δa between the individual antenna positions of the individual transmitting and receiving antennas.

Here, a (central) antenna position E of the antenna positions in the regular grid R is kept free. For the antenna position E kept free in the grid R, a synthetic received signal Esyn is generated/calculated, which corresponds to the received signal of a virtual transmitting and receiving antenna, which is defined at the antenna position E kept free in the grid R.

With the physically present transmitting and receiving antennas, radar signals previously emitted by the (multistatic) radar system 100 and reflected by any objects in a scene (not shown in FIG. 1) are received by the transmitting and receiving antennas of the antenna arrangement A via several signal channels K1, K2, to Kn.

The received signals Rx1 to Rxn of the transmitting and receiving antennas of the antenna arrangement A are first separated according to propagation time in this exemplary embodiment. Thus, in the subsequent processing, only the (received) signals within a certain distance to the radar system 100, i.e. signals within a so-called range bin, are treated.

From the (complex) amplitudes of the (received) signals recorded at the grid positions a sequence is generated by appending the (complex) amplitudes to each other. The sequence of (complex) amplitudes is also supplemented by a (complex) zero for the raster position of the virtual transmitting and receiving antenna E and by several (complex) zeros at the edges to such an extent that the number of zeros is a power of two which exceeds the number n corresponding to the number of unprocessed (raw) received signals by at least the factor m=4.

The sequence of (complex) amplitudes supplemented with the (complex) zeros is now cyclically shifted in such a way that the zero belonging to the synthetic channel (i.e. the received signal of the virtual transmitting and receiving antenna E) is positioned at the first position of the supplemented sequence.

A fast Fourier transformation (FFT) is applied to the supplemented and cyclically shifted sequence of (complex) amplitudes. The output of the FFT S(0), S(1), S(3) et cetera corresponds to the signal components of different directions of incidence of the (reflected back) received radar signals, whereby the phase relationship to the synthetic channel (the synthetic received signal) is already established.

Subsequently, the element with the largest amplitude is determined in the output S(0), S(1), S(3) et cetera of the FFT:

$$D = \underset{d}{\operatorname{argmax}}|S(D)|.$$

The element D with the largest amplitude is used directly as the synthetic received signal Esyn of the virtual transmitting and receiving antenna E with a suitable scaling, for example by a division with the number n of signal channels:

$$Esyn = \frac{S(D)}{n}.$$

In FIG. 2, a further exemplary embodiment of the radar system according to the invention is illustrated schematically.

In this exemplary embodiment, the transmitting and receiving antennas of the antenna arrangement A are arranged on a straight line G, whereby the individual transmitting and receiving antennas are not necessarily arranged equidistantly to each other.

In this exemplary embodiment, too, the received signals are separated beforehand according to propagation time. For the further processing, the (receive) signals within a range bin are again used, as already explained in relation with the above exemplary embodiment.

In such a range bin, separated according to the propagation time of the received signals, several measurements are now observed in rapid succession, so-called burst measurements. Based on the burst measurements, an empirical estimation of the covariance matrix between the transmitting and receiving antennas K1 to Kn is made possible. From the covariance matrix, the eigenvector H1, H2, H3, Hi to Hn, which corresponds to the eigenvalue with the highest magnitude, can be determined by principal component analysis.

The phases Phi of the eigenvector determined from the covariance matrix are then linearly interpolated to the position for which a synthetic received signal E is generated, i.e. the position of the virtual transmitting and receiving antenna:

$$\text{Phi} = \text{Angle}(H1) + \text{Angle}\left(\frac{H1}{H2}\right) \cdot \frac{d(E, K1)}{d(K1, K2)}.$$

The elements of the eigenvector H1, H2, H3, Hi to Hn are then (complex) conjugated with the respective (complex) amplitudes K1, K2, to Kn of the received signals, whereby the product for all n signal channels is summed up, whereby a focusing on the strongest signal propagation component is realised. Furthermore, the phase is corrected with the previously determined phase Phi, so that for the calculation of the synthetic receiving channel Esyn the following results in total:

$$Esyn=\exp(j\cdot\text{Phi})\cdot\Sigma_{i=1\,\ldots\,n}Ki\cdot\text{conj}(Hi).$$

In FIG. 3 an exemplary embodiment of the radar system 100 according to the invention is illustrated. In this exemplary embodiment, the radar system 100 comprises two radar units 10, 20, wherein a scene 200 in which several objects 210 are present is detected by the radar system 100.

In this exemplary embodiment, the two radar units 10, 20 are synchronised or guided by a common time and frequency reference unit 30. The common time and frequency reference unit 30 may be integrated in one of the participating radar units 10, 20.

Here, the common time and frequency reference unit 30 transmits time signals and/or frequency signals to the participating radar units 10, 20.

With regard to the propagation of the time signals and the phasing of the frequency signals, the effective line lengths of the lines which connect the common time and frequency reference unit 30 to the radar units 10, 20 may vary due to weather, temperature and ageing.

In this case, it may be advantageous, especially in relatively static scenes, not to initially correct for these variations when the radar units are detecting the same scene in operation and to apply the radar method described above in order to subsequently correct the phasing of the radar signals in the measured signals in a corresponding post-processing.

FIG. 4 shows a further exemplary embodiment of the radar system 100 according to the invention. In this exemplary embodiment, the radar system 100 has two radar units 10, 20 and detects the scene 200, as already shown in the exemplary embodiment illustrated in FIG. 3.

In FIG. 4, a known propagation component is generated in the field of view of the radar units 10, 20, whereby the search area for the composition model is reduced. Thus, it is no longer necessary to search the entire scene 200, but only a partial area of the entire scene 200, whereby the required time and also the effort for the radar method according to the invention can be further reduced.

For example, a known propagation component can be created by a waveguide, reflective surfaces, or small scattering bodies projecting into the beam path. In FIG. 4, a waveguide 40 is used to generate a known propagation component.

LIST OF REFERENCE SIGNS

A antenna arrangement;
E virtual transmitting and receiving antenna;
Esyn synthetic received signal;
G straight line;
H1, H2, H3 . . . Hi, Hn eigenvectors determined with a principal component analysis;
K1, K2, . . . Kn several signal channels (transmitting and receiving antennas);
R grid arrangement;
Rx1, . . . Rxn received signals;
100 radar system;
10, 20 radar units;

30 time and frequency reference unit;

40 waveguide;

200 scene (scenery);

210 multiple objects in the scene;

The invention claimed is:

1. A method for coherent evaluation of radar signals for a multistatic radar system, the method comprising:

receiving at least one or a plurality of received signals in one or a plurality of signal channels of an antenna arrangement, respectively;

disassembling the at least one or the plurality of received signals into propagation components, the propagation components comprising at least propagation time and Doppler components; and generating a synthetic received signal of a virtual transmitting and receiving antenna using at least one composition model on a basis of the one or the plurality of received signals.

2. The method of claim 1, comprising applying a time-division multiplexing method or a propagation time multiplexing method to the at least one or the plurality of received signals such that a count of the signal channels is greater than a count of the transmitting and receiving antennas of the antenna arrangement.

3. The method of claim 1, wherein the propagation components further comprise azimuth or elevation components, or both.

4. The method of claim 1, comprising weighting respective propagation or Doppler components lesser than corresponding weightings of other propagation components amongst the propagation components resulting from disassembling the at least one or the plurality of received signals, in generating the synthetic received signal.

5. The method of claim 1, wherein, propagation components having a same propagation time or Doppler component are disregarded in a calculation of propagation components of the synthetic received signal.

6. The method of claim 1, comprising disassembling the at least one or the plurality of received signals into principal components using a principal component analysis (PCA) technique.

7. The method of claim 1, comprising analyzing the at least one or the plurality of received signals using one of: an Independent-Component-Analysis, a Multiple-Signal-Classification, a Estimation-of-Signal-Parameters-via-Rational-Invariance-Techniques, or an Iterative-Sparse-Asymptotic-Minimum-Variance technique.

8. The method of claim 1, wherein the virtual transmitting and receiving antenna provides a reciprocal radio channel to at least one transmitting and receiving antenna of a further radar unit or radio installation which is away from the antenna arrangement.

9. The method of claim 3, comprising calculating propagation components of the synthetic received signal from azimuth and elevation components of the at least one or the plurality of received signals.

10. A multistatic radar system, comprising:

at least one radar unit with an antenna arrangement, the radar system configured to:

receive at least one or a plurality of received signals in one or a plurality of signal channels of an antenna arrangement, respectively;

disassemble the at least one or the plurality of received signals into propagation components, the propagation components comprising at least propagation time and Doppler components; and generate a synthetic received signal of a virtual transmitting and receiving antenna using at least one composition model on a basis of the one or the plurality of received signals.

11. The multistatic radar system of claim 10, wherein the antenna arrangement of the at least one radar unit comprises at least one or a plurality of transmitting and receiving antennas, wherein the at least one or the plurality of transmitting and receiving antennas are arranged on a straight line with the virtual transmitting and receiving antenna.

12. The multistatic radar system of claim 11, wherein the at least one or the plurality of transmitting and receiving antennas and the virtual transmitting and receiving antenna are arranged on an equidistant grid, and wherein a distance between respective grid points is an integer multiple of a predetermined distance.

13. The multistatic radar system of claim 10, wherein a count of the signal channels is greater than a count of the transmitting and receiving antennas of the antenna arrangement.

14. The multistatic radar system of claim 10, wherein the at least one radar unit and the antenna arrangement are mechanically coupled to or included as a portion of a vehicle.

15. The multistatic radar system of claim 10, wherein the propagation components further comprise azimuth or elevation components, or both.

16. The multistatic radar system of claim 15, wherein the radar system is configured to calculate propagation components of the synthetic received signal from azimuth and elevation components of the at least one or the plurality of received signals.

17. The multistatic radar system of claim 10, wherein the radar system is configured to weight respective propagation or Doppler components lesser than corresponding weightings of other propagation components amongst the propagation components resulting from disassembling the at least one or the plurality of received signals, to generate the synthetic received signal.

18. The multistatic radar system of claim 10, wherein the radar system is configured to disregard propagation components having a same propagation time or Doppler component in a calculation of propagation components of the synthetic received signal.

19. The multistatic radar system of claim 10, wherein the radar system is configured to apply a time-division multiplexing method or a propagation time multiplexing method to the at least one or the plurality of received signals such that a count of the signal channels is greater than a count of the transmitting and receiving antennas of the antenna arrangement.

* * * * *